United States Patent
Wang

(10) Patent No.: US 8,360,090 B2
(45) Date of Patent: Jan. 29, 2013

(54) SCHRADER VALVE/PRESTA VALVE DUAL-PURPOSE VALVE CAP

(75) Inventor: Lopin Wang, Taichung (TW)

(73) Assignee: Beto Engineering and Marketing Co., Ltd., Taichung (TW)

( * ) Notice: Subject to any disclaimer, the term of this patent is extended or adjusted under 35 U.S.C. 154(b) by 174 days.

(21) Appl. No.: 13/026,804

(22) Filed: Feb. 14, 2011

(65) Prior Publication Data

US 2012/0204973 A1 Aug. 16, 2012

(51) Int. Cl.
*F16K 15/20* (2006.01)
(52) U.S. Cl. ............ 137/223; 137/119.06; 137/231
(58) Field of Classification Search .......... 137/119.06, 137/223, 231
See application file for complete search history.

(56) References Cited

U.S. PATENT DOCUMENTS

| | | | | |
|---|---|---|---|---|
| 1,198,205 A * | 9/1916 | Engstrom | | 137/231 |
| 2,451,277 A * | 10/1948 | Crowley | | 137/231 |
| 4,489,855 A * | 12/1984 | Boetger | | 222/5 |
| 4,932,849 A * | 6/1990 | Scheffer | | 137/223 |
| 5,638,865 A * | 6/1997 | Wu | | 137/223 |
| 5,645,100 A * | 7/1997 | Chuang et al. | | 137/223 |
| 5,666,990 A * | 9/1997 | Wu | | 137/223 |
| 5,683,234 A * | 11/1997 | Chuang et al. | | 137/223 |
| 5,921,269 A * | 7/1999 | Wu | | 137/223 |
| 5,960,815 A * | 10/1999 | Wang | | 137/223 |
| 6,953,326 B2 * | 10/2005 | Wang | | 417/234 |
| 2005/0230499 A1 * | 10/2005 | Wang | | 239/390 |

* cited by examiner

*Primary Examiner* — John Rivell
(74) *Attorney, Agent, or Firm* — Muncy, Geissler, Olds & Lowe, PLLC

(57) ABSTRACT

A Schrader (American) valve/Presta (French) valve dual-purpose valve cap includes a casing comprising an axle hole, an end portion, and a through hole; a rotating device comprising a rod-like body and two heads, each head having a screw hole, the screw hole of one head being adapted for receiving a Presta valve, the screw hole of the other head being adapted for receiving a Schrader valve, the rod-like body comprising an accommodation chamber, two through holes and an annular groove, the annular groove defining an annular air passage, the rod-like body defining a through hole; two O-shaped seal rings sealed the annular air passage; and a ball accommodated in the accommodation chamber; wherein two semispherical recesses respectively formed on an inside wall of the accommodation chamber; the ball has a radius smaller than the radius of the semispherical recesses and greater than the radius of the through hole of each of the two heads.

3 Claims, 3 Drawing Sheets

SCHRADER VALVE/PRESTA VALVE DUAL-PURPOSE VALVE CAP

BACKGROUND OF THE INVENTION

1. Field of the Invention

The present invention relates to air valve caps for inflation apparatus and more particularly, to a Schrader (American) valve/Presta (French) valve dual-purpose valve cap.

2. Description of the Related Art

The most commonly seen air valves are the Schrader valve and the Presta valve. The Schrader valve is also called American valve having an outer diameter 8 mm and used on virtually every motor vehicle in the world today. The Presta valve is also called Sclaverand valve or French valve having an outer diameter 6 mm and commonly found in high pressure road style and many mountain bicycle inner tubes. These two types of air valves are different in diameter and structure and use a different valve cap. To solve this problem, dual-purpose valve caps were created. Conventional dual-purpose valve caps commonly have an American valve and a French valve arranged in parallel at one end and a lever located on the other end. When the air valve of the inflatable object to be inflated is connected to the American valve or French valve, operate the lever to squeeze a rubber socket in the dual-purpose valve cap, thereby elastically deforming the rubber socket and forcing the elastically deformed rubber socket to seize the air valve of the inflatable object. These dual-purpose valve caps further include a manual or automatic air passage switching mechanism to match the air valve inflation operation. These conventional dual-purpose valve caps commonly have a complicated structure and large size, and require a large operation space. Further, the air valve of the inflatable object may be disconnected from the rubber socket accidentally during the inflation operation.

SUMMARY OF THE INVENTION

The present invention has been accomplished under the circumstances in view. It is the main object of the present invention to provide a Schrader (American) valve/Presta (French) valve dual-purpose valve cap, which has a simple structure and compact size and avoids disconnection during use.

To achieve this and other objects of the present invention, a Schrader (American) valve/Presta (French) valve dual-purpose valve cap includes a casing comprising an axle hole, an end portion outwardly extended from the periphery thereof, and a through hole cut through the end portion in communication with the axle hole; a rotating device comprising a rod-like body rotatably accommodated in the axle hole of the casing and two heads respectively located on two distal ends of the rod-like body and disposed outside the casing and rotatable with the rod-like body relative to the casing, each head having a diameter greater than the rod-like body and a screw hole extending from an outer end edge toward an inner side thereof, the screw hole of one head being adapted for receiving a Presta valve, the screw hole of the other head being adapted for receiving a Schrader valve, the rod-like body comprising an accommodation chamber, two through holes respectively disposed in communication between the accommodation chamber and the screw hole of each of the two head and an annular groove extending around the periphery thereof, the annular groove defining an annular air passage in the axle hole in communication with the through hole of the end portion of the casing, the rod-like body defining a through hole in the annular groove in communication between the annular air passage and the accommodation chamber; two O-shaped seal rings respectively mounted on the rod-like body of the rotating device at two sides relative to the annular groove to seal the annular air passage; and a ball accommodated in the accommodation chamber; wherein two semispherical recesses respectively formed on an inside wall of the accommodation chamber at the connection area between the accommodation chamber and through hole of each of the two heads; the ball has a radius smaller than the radius of the semispherical recesses and greater than the radius of the through hole of each of the two heads.

DETAILED DESCRIPTION OF THE INVENTION

The invention will be described hereinafter in detail. The Schrader (American) valve/Presta (French) valve dual-purpose valve cap can be directly made in hand air pump, or connected to a hand air pump or any other air pumping device through a flexible air tube.

Figure 1:
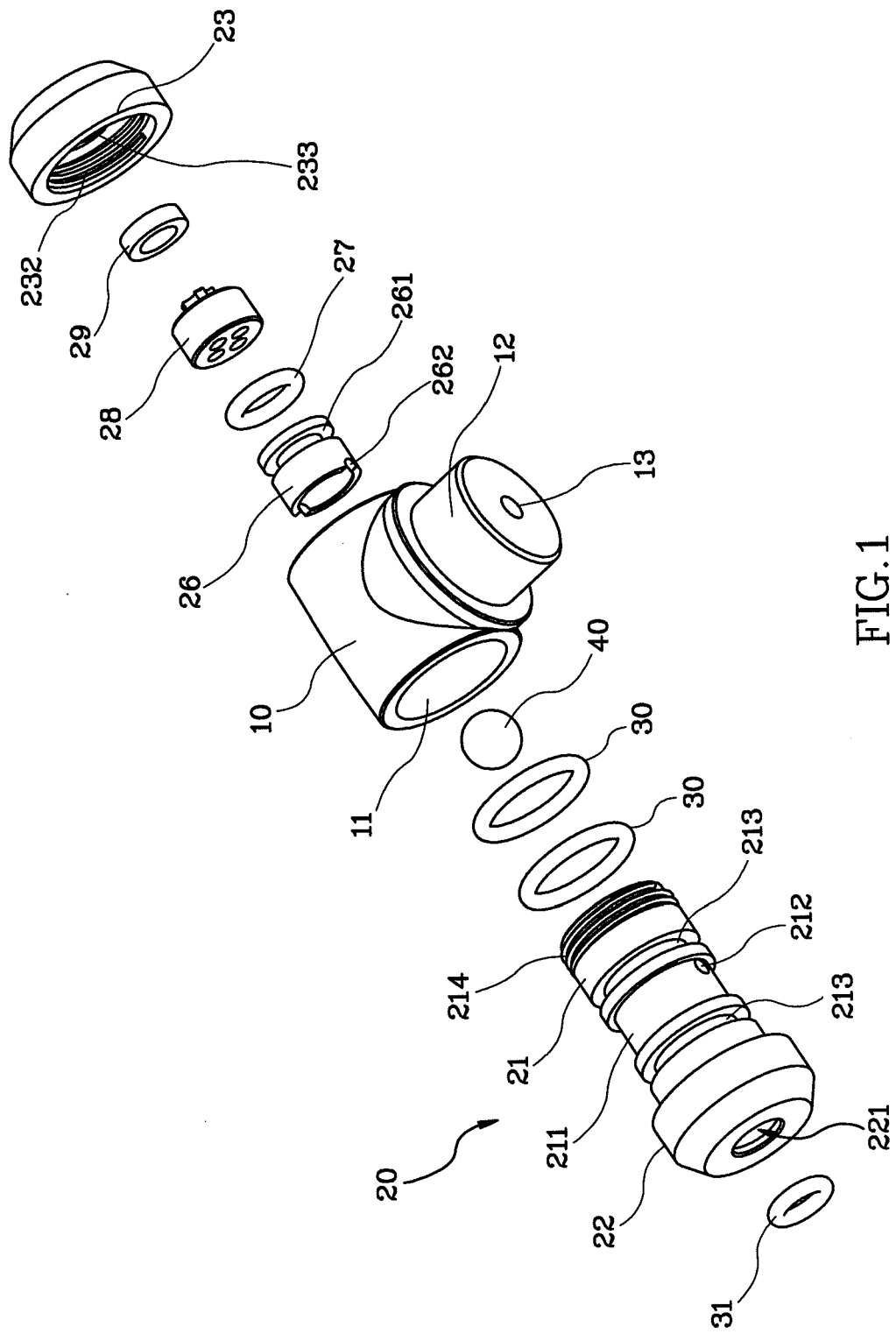
FIG. 1 is an exploded view of a Schrader (American) valve/Presta (French) valve dual-purpose valve cap in accordance with the present invention.
Figure 2:
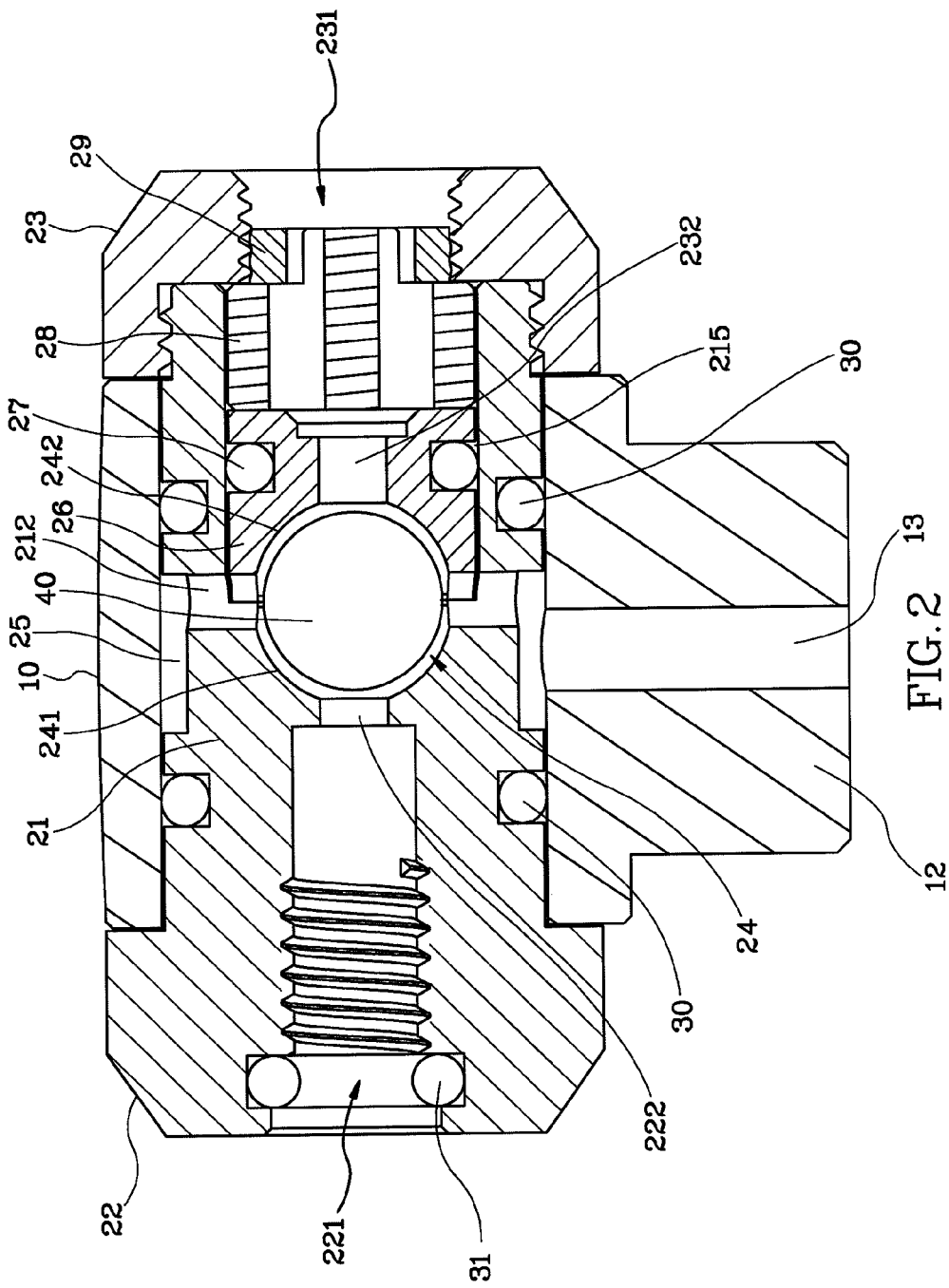
FIG. 2 is a sectional assembly view of the Schrader (American) valve/Presta (French) valve dual-purpose valve cap in accordance with the present invention.

As shown in FIGS. 1 and 2, a Schrader (American) valve/Presta (French) valve dual-purpose valve cap in accordance with the present invention is shown comprising a casing 10, a rotating device 20, two O-shaped seal rings 30 and a ball 40.

The casing 10 comprises an axle hole 11, an end portion 12 outwardly extended from the periphery thereof, and a through hole 13 cut through the end portion 12 in communication with the axle hole 11. According to the present preferred embodiment, the end portion 12 is connectable with a flexible air tube (not shown). Alternatively, the end portion 12 can be formed integral with a part of a hand air pump. In this case, the end portion 12 works as the rotation axis of the casing 10.

The rotating device 20 comprises a rod-like body 21, and two heads 22;23 respectively disposed at the two distal ends of the rod-like body 21. The heads 22;23 have a diameter greater than the rod-like body 21. The rod-like body 21 is accommodated in the axle hole 11 of the casing 10. The two heads 22;23 are respectively disposed outside the casing 10. Thus, the rotating device 20 is rotatable in the axle hole 11 and will not escape from the axle hole 11. The heads 22;23 each have a screw hole 221 or 231 extending from the respective outer end edge toward the inside. One screw hole 221 is adapted for receiving a Presta valve (see FIG. 3). The other screw hole 231 is adapted for receiving a Schrader valve (see FIG. 4). The rod-like body 21 defines therein an accommodation chamber 24 that is disposed in communication with the two screw holes 221 and 23 by two through holes 222 and 232 respectively, and an annular groove 211 around the periphery thereof. The annular groove 211 defines an annular air passage 25 in the axle hole 11 in communication with the through hole 13 of the end portion 12 of the casing 10. The rod-like body 21 also defines a through hole 212 in the annular groove 211 in communication between the annular air passage 25 and the accommodation chamber 24.

The two O-shaped seal rings 30 are respectively mounted on the rod-like body 21 of the rotating device 20 at two sides relative to the annular groove 211 to seal the annular air passage 25. According to the present preferred embodiment, the rod-like body 21 provides two locating grooves 213 around the periphery for the mounting of the two O-shaped seal rings 30.

The ball 40 is accommodated in the accommodation chamber 24.

Further, two semispherical recesses 241 and 242 are respectively formed on the inside wall of the accommodation chamber 24 at the connection area between the accommodation chamber 24 and the through holes 222 and 232. The ball 40 has a radius smaller than the radius of the semispherical recesses 241 and 242 and greater than the radius of the through holes 222 and 232.

One or both of the two heads 22;23 of the rotating device 20 are separately made and then affixed to the rod-like body 21. According to the present preferred embodiment, the head 23 of which the screw hole 231 is adapted for the connection of a Schrader (American) valve is separately made and then fastened to one end of the rod-like body 21. The rod-like body 21 has its one end terminating in an externally threaded connection end portion 216. The head 23 is shaped like a cap having an internally threaded connection portion 232 threaded onto the externally threaded connection end portion 216. Further, an adhesive may be applied to enhance the connection between the rod-like body 21 and the head 23. Except screw joint, scarf joint or adhesive bonding technique may be employed as a substitute. Further, the head 23 has a screw hole 233 at the center.

The rod-like body 21 has a recessed hole 215 located on its one end that is fastened up with the head 23. An insert block 26 is mounted in the recessed hole 215. The aforesaid accommodation chamber 24 is defined in between the inside wall of the recessed hole 215 and the insert block 26. The semispherical recesses 241 and 242 are respectively located on the inner side of the recessed hole 215 and the insert block 26. As shown in FIG. 1, the insert block 26 comprises a semispherical recess forming the aforesaid semispherical recesses 242, a locating groove 261 extending around the periphery, a through hole disposed on the middle and forming the aforesaid through hole 232, and notches 262 located on the bottom side. Further, an O-ring 27 is mounted in the locating groove 261 of the insert block 26 and peripherally stopped against the inside wall of the recessed hole 215 to seal the gap. An ejector block 28 mounted in the recessed hole 215 and disposed outside the insert block 26. A gasket ring 29 is mounted on the outer side of the ejector block 28. The aforesaid ejector block 28, gasket ring 29 and head 23 form a Schrader (American) valve connector. An O-ring 31 is mounted in the screw hole 221 near the output end, and adapted to seal the gap upon installation of a Presta (French) valve.

Figure 3:
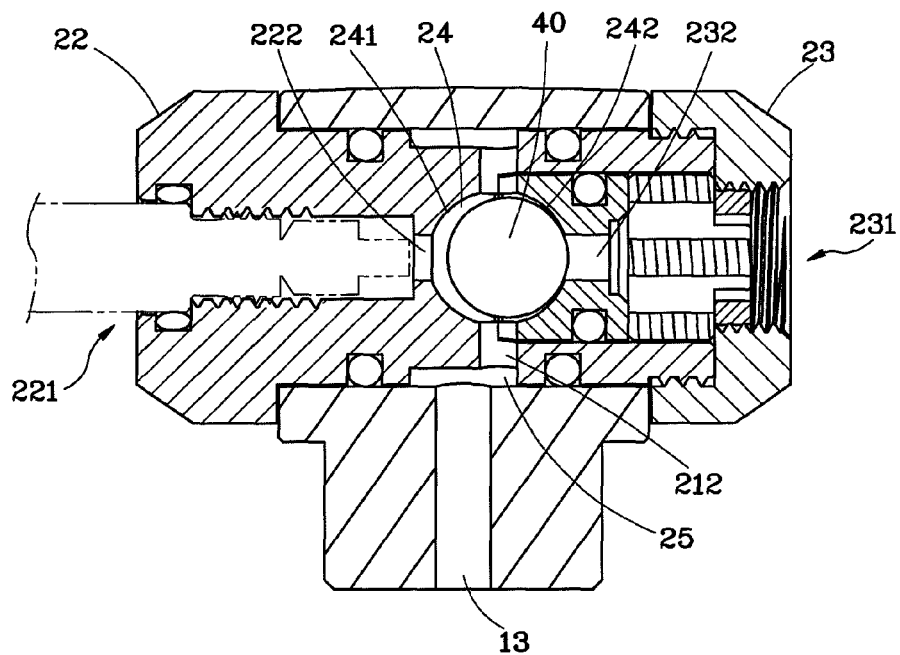
FIG. 3 is similar to FIG. 2, illustrating an inflation operation after installation of a Presta (French) valve.

As shown in FIG. 3, when a Presta (French) valve (see the imaginary line) is connected to the screw hole 221, the air that enters the through hole 13 goes through the annular air passage 25 and the through hole 212 into the accommodation chamber 24. At the initial stage, the air is discharged through the screw hole 231. However, the suction force induced by the air flow rapidly draws the ball 40 toward the through hole 232 at the semispherical recesses 242, thereby sealing the passage. When the ball 40 seals the through hole 232, compressed air in the accommodation chamber 24 immediately flows through the screw hole 221 into the Presta (French) valve (see the imaginary line) to inflate the inflatable object that carries the Presta (French) valve.

Figure 4:
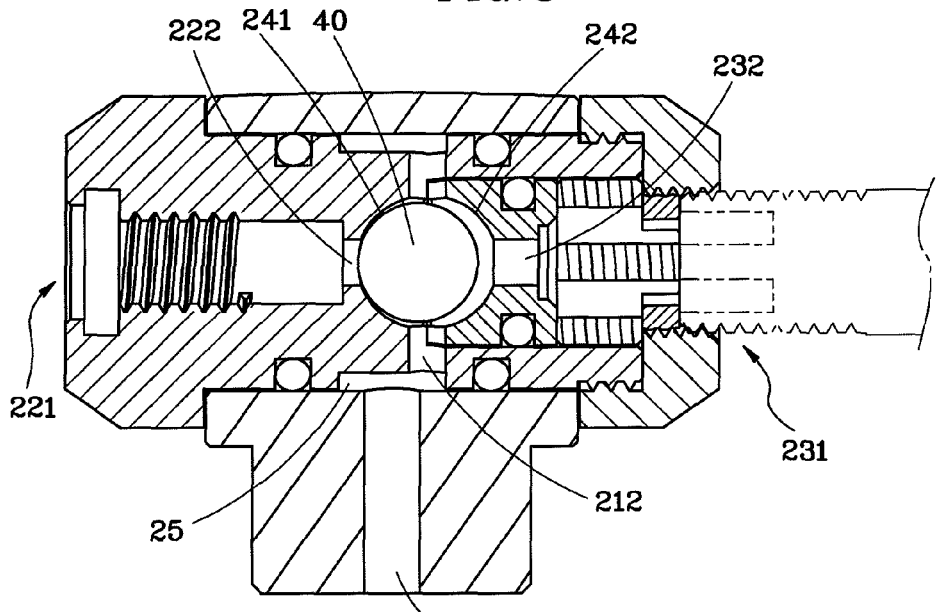
FIG. 4 is similar to FIG. 2, illustrating an inflation operation after installation of a Schrader (American) valve.

As shown in FIG. 4, if a Schrader (American) valve (see the imaginary line) is connected to the screw hole 231, the residual air of the inflatable object to be inflated, if any, will be discharged to move the ball 40 toward the through hole 222, forcing the ball 40 to block the through hole 222. If no air is discharged out of the inflatable object, the air that enters the through hole 13 will be discharged through the through hole 222 into the accommodation chamber 24. At this time, the suction force induced by the air flow rapidly draws the ball 40 toward the through hole 222, thereby sealing the passage. When the ball 40 seals the through hole 222, compressed air in the accommodation chamber 24 immediately flows into the Schrader (American) valve to inflate the inflatable object that carries the Schrader (American) valve.

According to this embodiment, the head 22 or 23 and the rod-like body 21 can be separately made, for example, the head 22 or 23 can be made of a metal material and embossed with a pattern, and the rod-like body 21 can be prepared from a plastic material and then fastened up with the head 22 or the head 23 by means of a screw joint, scarf joint or adhesive bonding technique.

Thus, the invention has the characteristics of compact structure and small size, and requires less space during operation. Further, the screw-connection design of the invention avoids any valve connection errors. Even under a dim light or dark environment, the user can check the connection correctness by the sense of touch when rotating the rotating device with the fingers to fasten the air valve. Once the connection is done, the connection stability is assured for convenient use, Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A Schrader (American) valve/Presta (French) valve dual-purpose valve cap, comprising: a casing comprising an axle hole, an end portion outwardly extended from the periphery thereof, and a through hole cut through the end portion in communication with the axle hole; a rotating device comprising a rod-like body rotatably accommodated in the axle hole of the casing and two heads respectively located on two distal ends of the rod-like body and disposed outside the casing and rotatable with the rod-like body relative to the casing, each head having a diameter greater than the rod-like body and a screw hole extending from an outer end edge toward an inner side thereof, the screw hole of one head being adapted for receiving a Presta valve, the screw hole of the other head being adapted for receiving a Schrader valve, the rod-like body comprising an accommodation chamber, two through holes respectively disposed in communication between the accommodation chamber and the screw hole of each of the two heads and an annular groove extending around the periphery thereof, the annular groove defining an annular air passage in the axle hole in communication with the through hole of the end portion of the casing, the rod-like body defining a through hole in the annular groove in communication between the annular air passage and the accommodation chamber; two O-shaped seal rings respectively mounted on the rod-like body of the rotating device at two sides relative to the annular groove to seal the annular air passage; and a ball accommodated in the accommodation chamber; wherein two semispherical recesses respectively formed on an inside wall of the accommodation chamber at the connection area between the accommodation chamber and through hole of each of the two heads; the ball has a radius smaller than the radius of the semispherical recesses and greater than the radius of the through hole of each of the two heads.

2. The Schrader (American) valve/Presta (French) valve dual-purpose valve cap as claimed in claim 1, wherein at least one of the two heads is separately made and then fastened to the rod-like body.

3. The Schrader (American) valve/Presta (French) valve dual-purpose valve cap as claimed in claim 2, wherein the rod-like body of the rotating device further comprises a recessed hole located on one end thereof, and an insert block mounted in the recessed hole; the accommodation chamber is defined in between an inside wall of the recessed hole and the insert block.

\* \* \* \* \*